US009311725B2

(12) United States Patent  
Clark

(10) Patent No.: US 9,311,725 B2  
(45) Date of Patent: Apr. 12, 2016

(54) SYSTEMS AND METHODS FOR CREATING AN ELECTRONIC SIGNATURE

(71) Applicant: Barracuda Networks, Inc., Campbell, CA (US)

(72) Inventor: Thorfinn A. Clark, Beverly Hills, CA (US)

(73) Assignee: BARRACUDA NETWORKS, INC., Campbell, CA (US)

( * ) Notice: Subject to any disclaimer, the term of this patent is extended or adjusted under 35 U.S.C. 154(b) by 274 days.

(21) Appl. No.: 13/910,991

(22) Filed: Jun. 5, 2013

(65) Prior Publication Data

US 2013/0328886 A1 Dec. 12, 2013

Related U.S. Application Data

(60) Provisional application No. 61/656,635, filed on Jun. 7, 2012.

(51) Int. Cl.  
*G06F 17/00* (2006.01)  
*G06T 11/20* (2006.01)  
*G06K 9/22* (2006.01)

(52) U.S. Cl.  
CPC ............. *G06T 11/203* (2013.01); *G06K 9/222* (2013.01)

(58) Field of Classification Search  
None  
See application file for complete search history.

(56) References Cited

U.S. PATENT DOCUMENTS

| | | | | |
|---|---|---|---|---|
| 5,239,292 | A * | 8/1993 | Willan | 345/441 |
| 6,373,490 | B1 * | 4/2002 | Bendiksen et al. | 345/441 |
| 7,586,490 | B2 * | 9/2009 | McDaniel | 345/441 |
| 2003/0215140 | A1 * | 11/2003 | Gounares et al. | 382/187 |
| 2004/0228532 | A1 * | 11/2004 | Fernandez et al. | 382/187 |
| 2006/0274057 | A1 * | 12/2006 | Van Ness et al. | 345/179 |
| 2008/0180410 | A1 * | 7/2008 | McCall et al. | 345/179 |
| 2011/0304643 | A1 * | 12/2011 | Marison | 345/611 |
| 2012/0139863 | A1 * | 6/2012 | Lee | 345/173 |

FOREIGN PATENT DOCUMENTS

JP 63286978 A * 11/1988 ............. G06F 15/62

* cited by examiner

*Primary Examiner* — David H Chu  
(74) *Attorney, Agent, or Firm* — Duane Morris LLP; David T. Xue

(57) ABSTRACT

Systems and methods for creating an electronic signature that looks like a handwritten signature.

16 Claims, 7 Drawing Sheets

```
Config_Array["Mouse"] = {                        800
        A_Adjust = 0.05,
        B_Adjust = 0.25,
        Draw_Interval = 50,                              Figure 8
        Array_Speed = {
                1 = [3, 40, 0.5],
                2 = [2.8, 45, 0.55],
                ...
                (using format speed = [Line_width, Line_color, Line_opacity])
        }
}
Config_Array["Touchpad"] = {        802
        A_Adjust = .08,
        B_Adjust = .45,
        Draw_Interval = 20,
        Array_Speed = {
                1 = [5, 30, 0.4],
                2 = [4.5, 35, 0.45],
                ...
                (using format speed = [Line_width, Line_color, Line_opacity])
        }
}
....
```

Step 1:
$Line_{OldX,Y} = Pointer_{CurrentX,Y}$
$Pointer_{CurrentX,Y} = (X_D, Y_D)$
$Adjust_{OldX}$ = Undefined
$Adjust_{OldY}$ = Undefined
$Adjust_{NewX} = ((Pointer_{CurrentX} - Line_{OldX}) * A\_Adjust) * B\_Adjust$
$Adjust_{NewY} = ((Pointer_{CurrentY} - Line_{OldY}) * A\_Adjust) * B\_Adjust$
$Line_{NewX} = Line_{OldX} + Adjust_{NewX}$
$Line_{NewY} = Line_{OldY} + Adjust_{NewY}$ Step 2:
$Adjust_{NewX} = (Adjust_{OldX} + (Pointer_{CurrentX} - Line_{OldX}) * A\_Adjust) * B\_Adjust$
$Adjust_{NewY} = (Adjust_{OldY} + (Pointer_{CurrentY} - Line_{OldY}) * A\_Adjust) * B\_Adjust$
$Line_{NewX} = Line_{OldX} + Adjust_{NewX}$
$Line_{NewY} = Line_{OldY} + Adjust_{NewY}$
$Adjust_{OldX} = Adjust_{NewX}$
$Adjust_{OldY} = Adjust_{NewY}$ Draw line from $Line_{OldX,Y}$ to $Line_{NewX,Y}$ Set $Line_{OldX,Y} = Line_{NewX,Y}$ Repeat Step 2 For Each Instance of Blocks B510-B514

Figure 9

SYSTEMS AND METHODS FOR CREATING AN ELECTRONIC SIGNATURE

CROSS-REFERENCE TO RELATED APPLICATIONS

This application claims priority to provisional application Ser. No. 61/656,635, filed on Jun. 7, 2012, the entire contents of which are hereby incorporated by reference.

TECHNICAL FIELD

The present embodiments relate to creating an electronic signature.

BACKGROUND

The practice of using a signature that is handwritten is longstanding. As the role of computers, the Internet, and smartphones in commerce has increased, society's comfort with handwritten signatures remains, but the technology to produce electronic signatures that resemble handwritten ones has lagged. It remains very difficult to use a tool such as a smartphone, computer mouse, trackpad, or similar input device, to recreate the look and feel of pen-and-ink with which people are most comfortable. There is thus a need for a method by which electronic signatures can be created that resemble pen-and-ink signatures to facilitate people's comfort with commercial and personal transactions using such a signature.

SUMMARY

The various embodiments of the present systems and methods for creating an electronic signature have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

Characteristics of a line segment to be drawn between two points are determined based on the values of several variables. The line segments have at least color, opacity, and thickness. These characteristics are determined according to the speed of the on-screen pointer during a set interval, where for faster speeds the color and opacity are lighter, and the thickness is less, and for slower speeds the color and opacity are darker, and the thickness is greater.

In an embodiment, the line segment to be drawn extends from the endpoint of the previously drawn line segment and a point on a line between that endpoint and the current position of the pointer, but short of the current position of the pointer. In an embodiment, the acceleration between line segments is also computed and applied. In an embodiment, Bezier curves are drawn through multiple points.

One embodiment comprises a machine-implemented method for producing a signature on an electronic display of a computing device using an input device that controls a pointer on the display. The method comprises detecting a user input of a start signal. The method further comprises detecting x,y coordinates of a start position of the pointer, and storing the start position in a memory associated with the computing device as a first variable. The method further comprises setting values of second and third variables equal to the detected x,y coordinates and storing these values in the memory. The method further comprises setting a value of a fourth variable equal to zero and storing this value in the memory. The method further comprises waiting for a set interval. The method further comprises after the set interval, detecting x,y coordinates of a current position of the pointer, and storing this location in the memory as the first variable. The method further comprises determining whether the first variable is equal to the second variable. The method further comprises if the first variable is not equal to the second variable, calculating a speed of the pointer during the set interval, setting the fourth variable equal to the calculated speed, and storing the fourth variable value in the memory. The method further comprises determining characteristics of a line segment to be drawn based on the values of the first, third and fourth variables. The method further comprises drawing a line segment on the display having the determined characteristics between the second variable and a fifth variable.

Another embodiment comprises a system for producing an electronic signature. The system comprises a signature generator module, including an input module, a processing module, and an output module. The system further comprises a plurality of position variables, a plurality of configuration variables, and a display. The signature generator module is configured to detect a user input of a start signal, detect x,y coordinates of a start position of the pointer, and store the start position in a memory associated with a computing device as a first variable, set values of second and third variables equal to the detected x,y coordinates and store these values in the memory, set a value of a fourth variable equal to zero and store this value in the memory, wait for a set interval, after the set interval, detect x,y coordinates of a current position of the pointer, and store this location in the memory as the first variable, determine whether the first variable is equal to the second variable, if the first variable is not equal to the second variable, calculate a speed of the pointer during the set interval, set the fourth variable equal to the calculated speed, and store the fourth variable value in the memory, determine characteristics of a line segment to be drawn based on the values of the first, third and fourth variables, and draw a line segment on the display having the determined characteristics between the second variable and a fifth variable.

Another embodiment comprises a machine-implemented method for producing a signature on an electronic display of a computing device using an input device that controls a pointer on the display. The method comprises detecting a user input of a start signal. The method further comprises detecting x,y coordinates of a start position of the pointer, and storing the start position in a memory associated with the computing device as a first variable. The method further comprises waiting for a set interval. The method further comprises after the set interval, detecting x,y coordinates of a current position of the pointer, and storing this location in the memory as a second variable. The method further comprises calculating a distance between the values of the first and second variables. The method further comprises determining characteristics of a line segment to be drawn based on the values of the first and second variables. The method further comprises drawing a line segment on the display having the determined characteristics between the first and second variables.

BRIEF DESCRIPTION OF THE DRAWINGS

The various embodiments of the present systems and methods for creating an electronic signature now will be discussed in detail with an emphasis on highlighting the advantageous features. These embodiments depict the novel and non-obvious systems and methods shown in the accompanying drawings, which are for illustrative purposes only. These drawings include the following figures, in which like numerals indicate like parts:

FIG. 8 is example code for determining line characteristics in creating an electronic signature, according to the present embodiments; and FIG. 9 illustrates a process for creating an electronic signature, according to the present embodiments.

DETAILED DESCRIPTION

Figure 1:
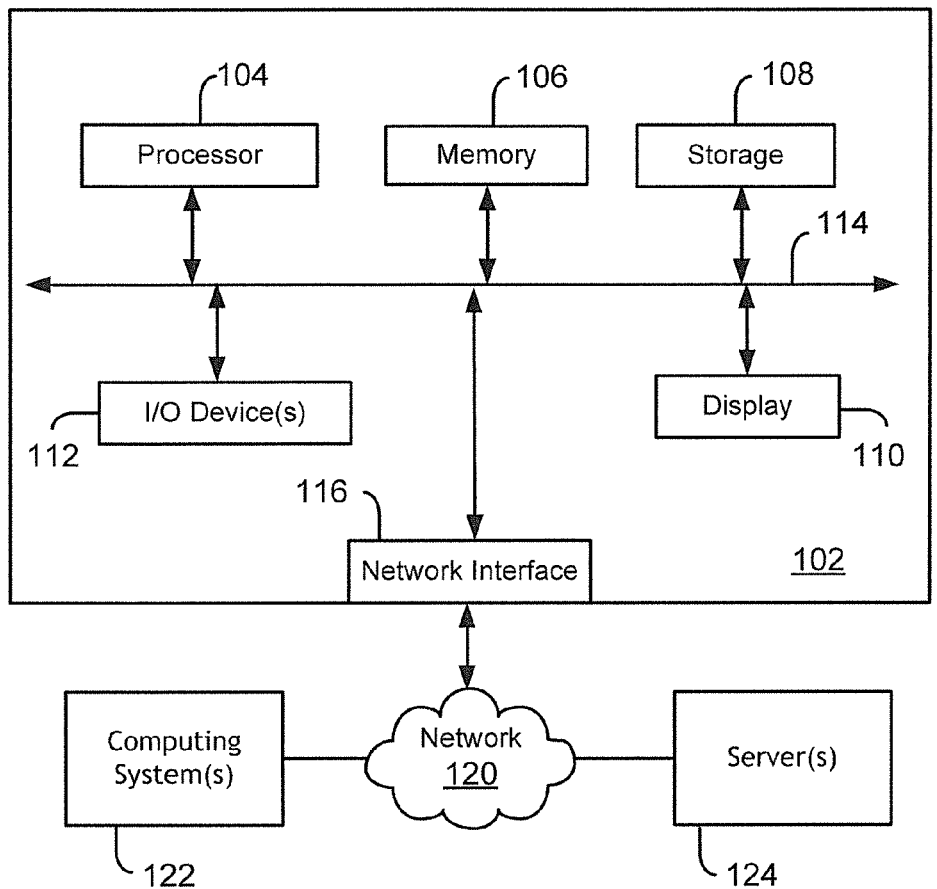
FIG. 1 is a block diagram of one embodiment of the present system.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The embodiments disclosed herein, may be implemented as a computer process (method), a computing system, or as an article of manufacture, such as a computer program product or machine-readable media. The term "machine-readable media" and the like refers to any kind of medium for retaining information in any form, including various kinds of storage devices (magnetic, optical, static, etc.). The computer program product may be non-transitory computer storage media, readable by a computer device, and encoding a computer program of instructions for executing a computer process. The computer program product may also be a propagated signal on a carrier, readable by a computing system, and encoding a computer program of instructions for executing a computer process.

The present embodiments are configured to produce a representation of a user's signature on a display screen that approximates the appearance of a pen-and-paper signature. When a person creates a physical signature using pen and paper, he or she may apply varying pressure from the beginning of the signature to the end, and may move the pen at varying speeds from the beginning of the signature to the end. Thus, the final product includes areas where the color is darker and/or the line is thicker because greater pressure was applied there and/or the pen was moving relatively slowly. The final product also includes areas where the color is lighter and/or the line is thinner because less pressure was applied there and/or the pen was moving relatively quickly. Current systems known to the inventors for producing on-screen signatures do not take these variations into account. Thus, the final on-screen signature does not accurately represent a pen-and-paper signature. The present embodiments address this shortcoming in the prior art.

FIG. 1 shows an example of a system 100, used according to one embodiment. System 100 may include a user computing system 102, which may be referred to as a host system. A typical user computing system 102 includes several functional components, including a central processing unit (CPU) (also referred to as a processor or processing module) 104, a host memory (or main/system memory) 106, a storage device 108, a display 110, input/output ("I/O") device(s) 112, and other components (or devices).

Host memory 106 is coupled to processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Host memory 106 provides processor 104 access to data and program information that is stored in host memory 106 at execution time. Typically, host memory 106 includes random access memory (RAM) circuits, read-only memory (ROM), flash memory, or the like, or a combination of such devices. Instructions that implement the processes described below may reside in and may be executed (by the processor 104) from the memory 106.

The storage device 108 may comprise one or more internal and/or external mass storage devices, which may be or may include any conventional medium for storing large volumes of data in a non-volatile manner. For example, storage device 108 may include conventional magnetic disks, optical disks such as CD-ROM or DVD-based storage, magneto-optical (MO) storage, flash-based storage devices, or any other type of non-volatile storage devices suitable for storing structured or unstructured data. The display 110 may comprise any device capable of displaying output, such as an LCD or LED screen. The I/O device(s) 112 may include, for example, a keyboard, a mouse, etc.

System 100 also includes a network interface 116, through which the system communicates with a network 120. The network interface 116 may comprise a network interface card (NIC) or any other device for facilitating communication between the system 100 and other devices. The network 120 comprises a plurality of computing system(s) 122, which may comprise other user systems and/or one or more server(s) 124. The server 124 comprises a computing system having at least one processor 104, memory 106, storage 108 and a network interface 116. The systems 120, 122, 124 communicate over links that are interconnected through network devices such as switches and routers (not shown).

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

Figure 2:
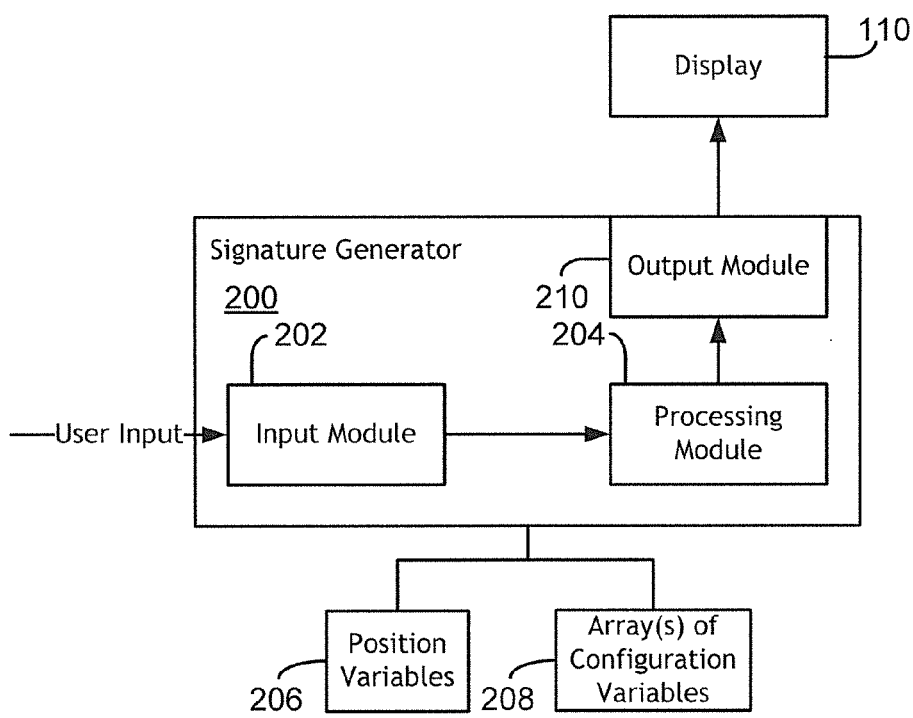
FIG. 2 is a block diagram of another embodiment of the present system.

FIG. 2 illustrates one embodiment of a signature generator module 200 used to create an electronic representation of a pen-and-paper signature, as described below. The signature generator 200 may be stored at one or more of the computing systems 122 in the network, such as in the memory 106 of one or more servers 124. Alternatively, the signature generator 200 may be stored locally on the user device 102 and executed by the user device processor 104 out of the user device memory 106.

In the illustrated embodiment, the signature generator 200 includes an input module 200 that receives user input from the I/O device(s) 112. For purposes of FIG. 2, the I/O device 112 may be any device capable of manipulating an on-screen pointer or otherwise generating a visible on-screen output representative of the motion of the I/O device 112. Examples of I/O devices 112 include, without limitation a mouse, a trackball, a touchpad, a pointing stick, etc. The I/O device 112 may also be considered to be a user's finger or a stylus, for example, when used in connection with a touch screen device. The input module 200 receives input representative of motion of the I/O device 112. The input module 200 may perform pre-processing on the received input before passing it to a processing module 204. The processing module 204 includes instructions for generating an on-screen electronic representation of a pen-and-paper signature based on the received input, which is based on movement of the input device 112. The processing module 204 receives as inputs at least position variables 206 stored as a data structure in memory 106 or any other location. The position variables 206 comprise the user input, which indicates the current position of the input device 112, and also stored information about a previous positions and speed of the input device 112 and, in some embodiments, stored information about an endpoint of a last-drawn line segment, as described below.

In some embodiments, the processing module 204 may also receive as inputs one or more configuration variables 208. The configuration variables 208 are data structures stored in, for example, one or more arrays. The configuration variables 208 are described further below. The processing module 204 receives the foregoing inputs, performs processing, and generates an output, which it passes the output to an output module 210, which displays the on-screen signature on the display 110.

In the present embodiments, the user is presented with an on-screen interface where his or her signature will appear. For example, the user may sign an electronic document presented on an Internet web page. The page may include a blank space where the user is instructed to position the on-screen pointer to produce the on-screen signature. To begin, the user positions the pointer inside the box at a location where the signature will begin. The user then inputs a start signal and moves the I/O device 112 to trace his or her signature. When the signature is complete, the user inputs an end signal and the process ends. For example, the start signal may be the user depressing a mouse button, or tapping his or her finger on a touchpad, and the end signal may be the user releasing the mouse button, or lifting his or her finger off the touchpad.

Example embodiments of the present methods for creating an electronic signature are described below. In general, however, the present embodiments detect a location of an on-screen pointer at regular intervals as the pointer moves across the display screen. A series of line segments are drawn, with one segment being drawn for each interval. Characteristics of each line segment, such as length, color, opacity, thickness, etc., are determined according to a speed of movement of the I/O device 112 in the interval corresponding to each line segment. Characteristics of the signature, such as color, opacity, thickness, etc., thus vary from the beginning of the signature to the end, thereby creating a more realistic looking signature as compared to prior art methods known to the inventors.

Figure 3:
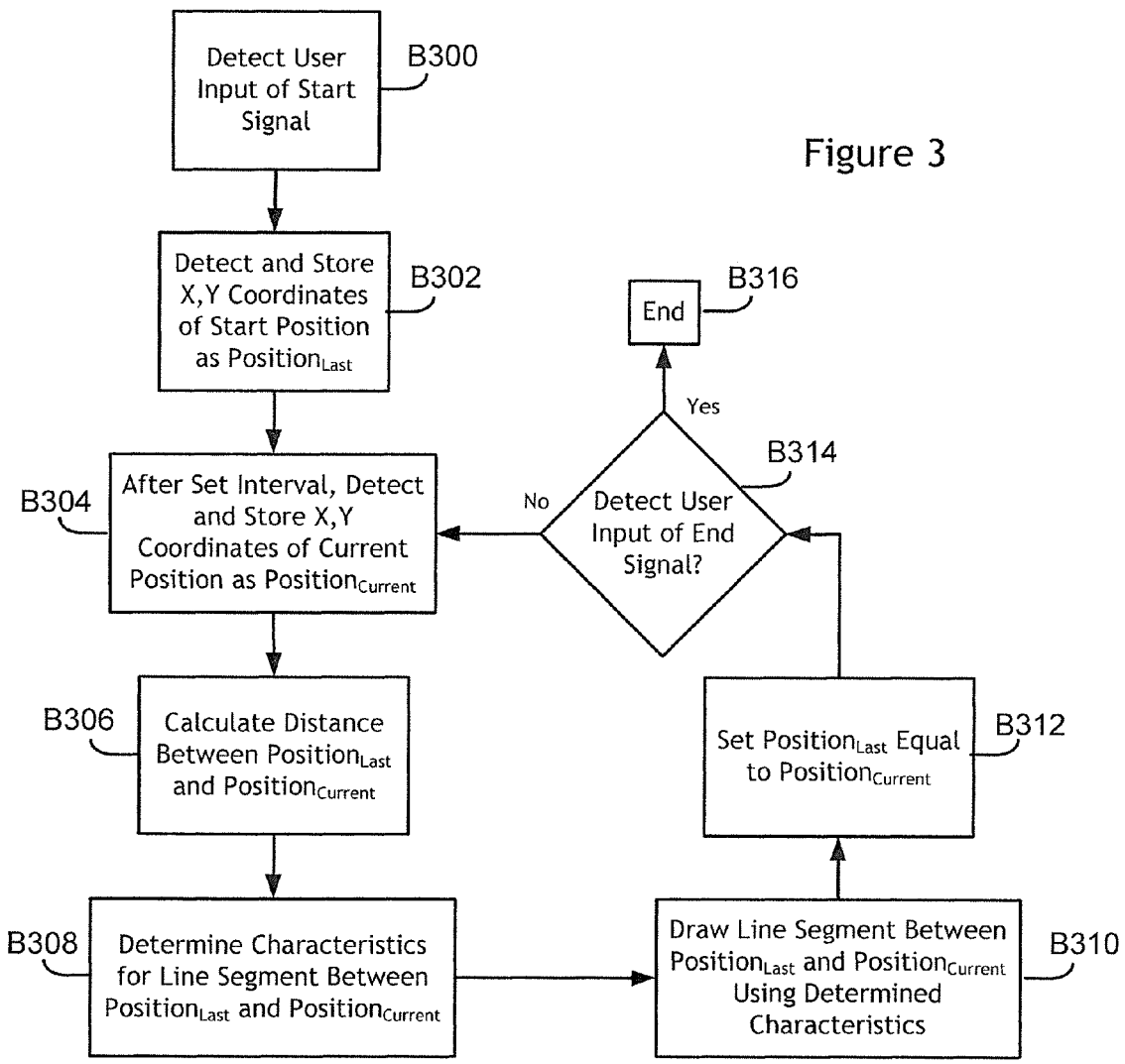
FIG. 3 is a flowchart illustrating one method of creating an electronic signature, according to the present embodiments.

FIG. 3 is a flowchart illustrating one method of creating an electronic signature, according to the present embodiments. The process begins at block B300 when a user input of a start signal is detected. At block B302, the system detects the location, in terms of x,y coordinates, of the start position of the on-screen pointer, and stores this location in the memory 106 as a position variable 206 (FIG. 2). This variable may be stored as, for example, $Position_{Last}$. While the illustrated flowchart shows the steps of detecting and storing in the same box, these steps may be performed asynchronously, such that they could be represented as separate boxes, with detecting in a first box and storing in a second box. This point is true for all of the processes described herein, and therefore will not be repeated in the descriptions of other steps/processes below.

The process then waits a set interval, at block B304. The set interval represents an amount of time that the process waits before getting a next data point. The next data point may be obtained by, for example, polling the computing system to learn a current location of the on-screen pointer. Thus, the set interval may also be referred to as a polling interval or sampling interval. The length of the sampling interval may be any value, such as 100 ms. A shorter sampling interval will produce a signature that more accurately represents the actual motion produced by the user manipulating the I/O device 112, because more data points will be collected, but will also consume more processor resources.

Continuing block at block B304, after the set interval passes the system detects the x,y coordinates of the current position of the on-screen pointer, and stores this location in the memory 106 as the position variable (206) $Position_{Current}$. The process then moves to block B306 where the distance between $Position_{Last}$ and $Position_{Current}$ is calculated. Then the process moves to block B308, where characteristics of the line segment to be drawn between $Position_{Last}$ and $Position_{Current}$ are determined. Example line segment characteristics include color, opacity, thickness, and any other characteristics that affect the appearance of the line segment. Values for these characteristics are determined according to the speed at which the I/O device 112, and thus the on-screen pointer, was moving during the set interval. The speed is calculated by subtracting $Position_{Last}$ from $Position_{Current}$ and dividing the value by the magnitude of the set interval, which is a known constant, although the magnitude of the set interval can be set to any value for any given signature session.

Again, the line segment characteristics such as color, opacity and/or thickness are determined according to the speed at which the I/O device 112, and thus the on-screen pointer, was moving during the set interval. For faster speeds, the color and opacity will be lighter, and the thickness will be less. Whereas, for slower speeds, the color and opacity will be darker, and the thickness will be greater. These characteristics reflect physical signatures made with pen and paper, where a faster moving pen writes lines that are relatively lighter and thinner, and a slower moving pen writes lines that are relatively darker and thicker. The on-screen signature produced by the present methods thus more accurately represents a physical pen-and-paper signature.

Once the line segment characteristics have been determined, the process moves to block B310, where the line segment having the determined characteristics is drawn from $Position_{Last}$ to $Position_{Current}$. The process then moves to block B312 where $Position_{Last}$ is set equal to $Position_{Current}$. At block B314, the process determines whether a user input of an end signal has been detected. If it has, the process ends at block B316. However, if an end signal has not been detected, then the process loops back to block B304 and blocks B304-B314 are repeated.

Figure 4:
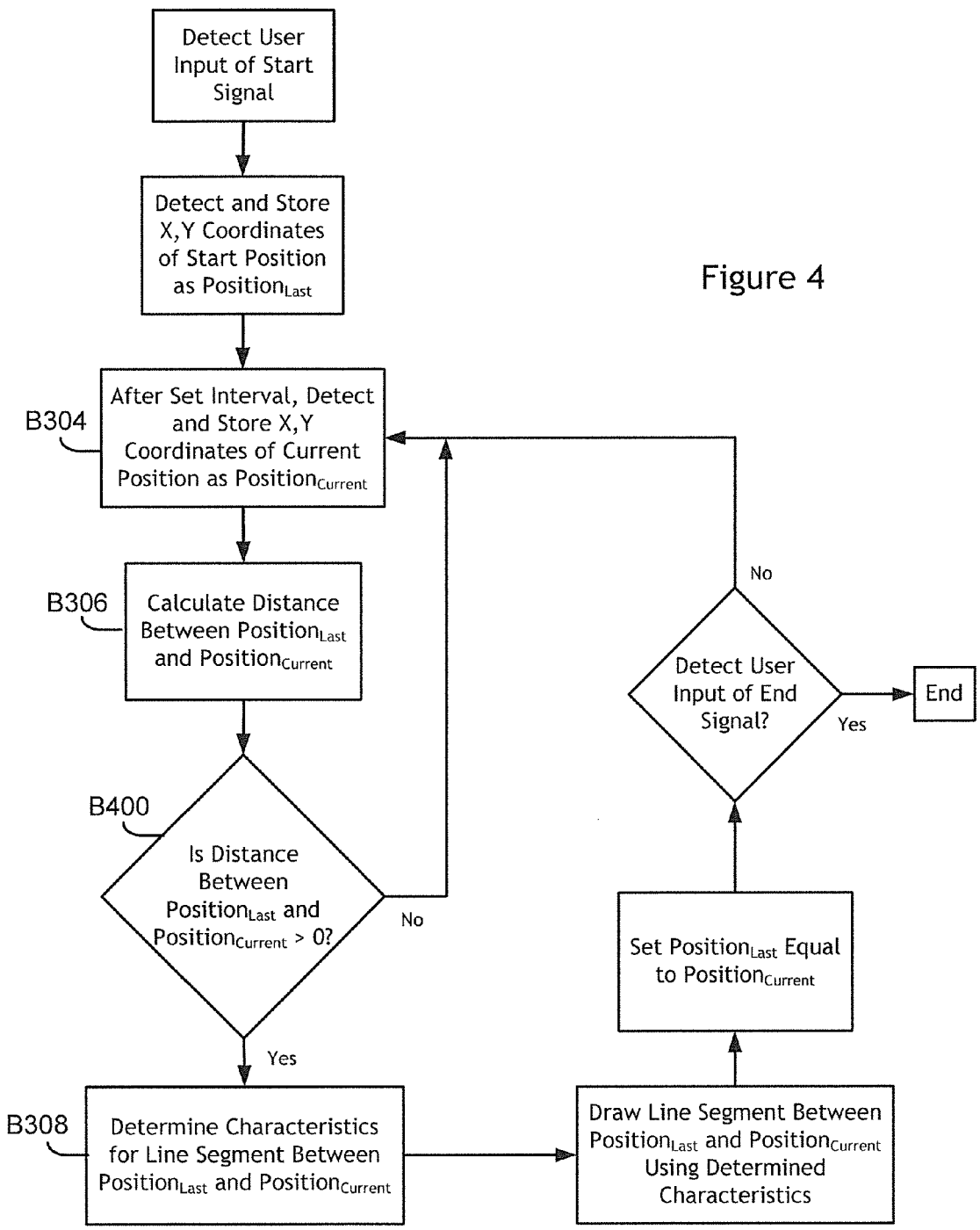
FIG. 4 is a flowchart illustrating another method of creating an electronic signature, according to the present embodiments.

FIG. 4 is a flowchart illustrating another method of creating an electronic signature, according to the present embodiments. The process of FIG. 4 is similar to that of FIG. 3, but adds an additional step. After block B306, if the distance between $Position_{Last}$ and $Position_{Current}$ is equal to zero, because the user did not move the I/O device 112 during the set interval, then at block B400 the process loops back to block B304, which is described above with reference to FIG. 3. However, if the distance between $Position_{Last}$ and $Position_{Current}$ is greater than zero, then process advances to block B308, which is also described above with reference to FIG. 3. The process of FIG. 4 thus bypasses steps B308-B314 when the user does not move the I/O device 112 during the set interval, because without movement of the I/O device 112 these steps are unnecessary.

Figure 5:
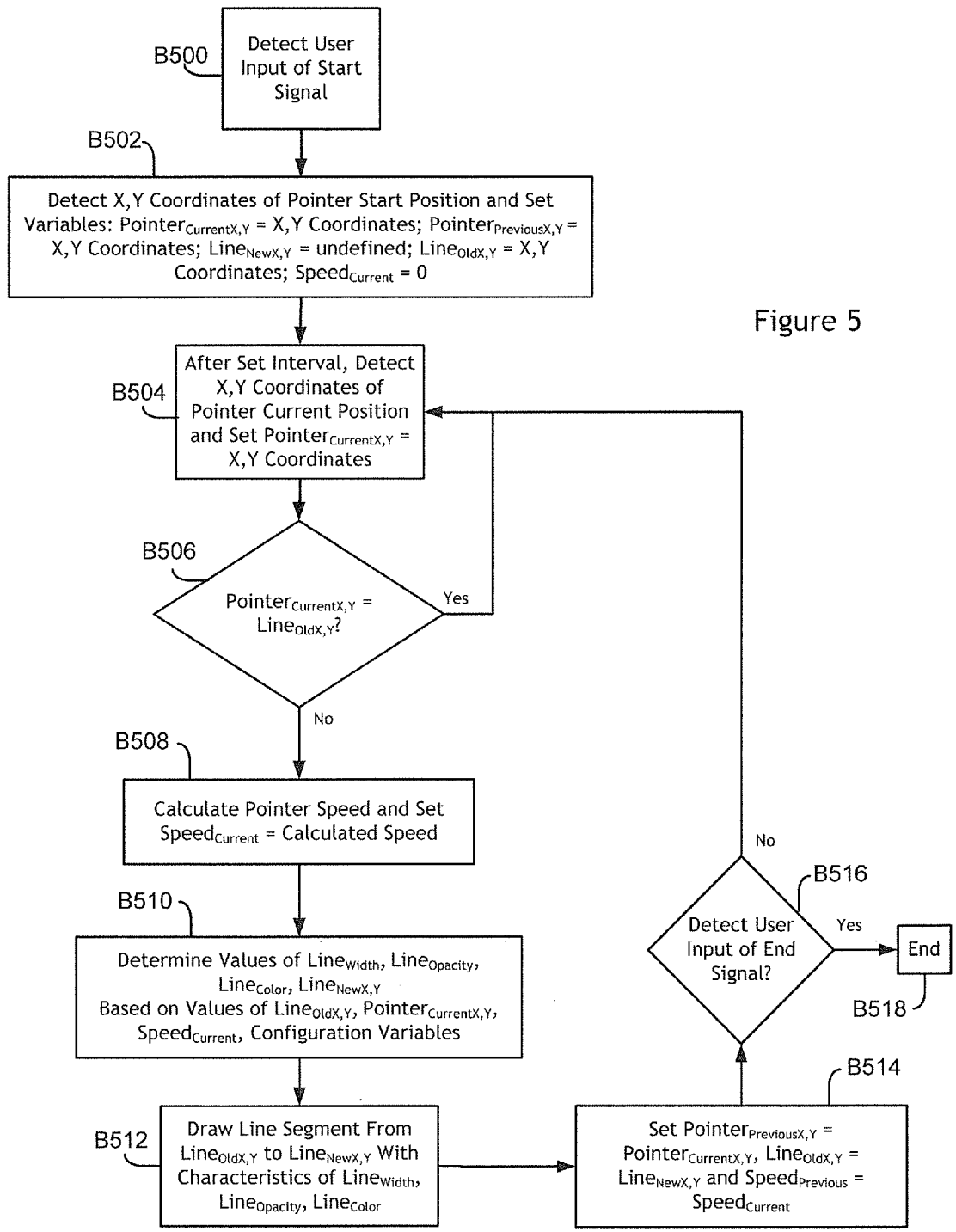
FIG. 5 is a flowchart illustrating another method of creating an electronic signature, according to the present embodiments.

FIG. 5 is a flowchart illustrating another method of creating an electronic signature, according to the present embodiments. The process begins at block B500 when a user input of a start signal is detected. At block B502, the system detects the x,y coordinates of the start position of the on-screen pointer, and stores this location in the memory 106 as the position variable (206) $Pointer_{CurrentX,Y}$. The process also sets the values of the position variables (206) $Pointer_{PreviousX,Y}$ and $Line_{OldX,Y}$ equal to the detected x,y coordinates and stores these values in the memory 106. The process further sets the value of the variable $Speed_{Current}$ equal to zero and stores this value in the memory 106. The variable $Line_{NewX,Y}$ remains undefined.

The process then waits a set interval, at block B504. After the set interval passes the system detects the x,y coordinates of the current position of the on-screen pointer, and stores this location in the memory 106 as the position variable (206) $Pointer_{CurrentX,Y}$. At block B506, the process determines whether $Pointer_{CurrentX,Y}$ is equal to $Line_{OldX,Y}$. If it is, the pointer either hasn't moved or was moving but has stopped, and the process loops back to block B504. However, if $Pointer_{CurrentX,Y}$ is not equal to $Pointer_{PreviousX,Y}$, then the process moves to block B508 where the speed of the on-screen pointer during the set interval is calculated and the position variable (206) $Speed_{Current}$ is set equal to the calculated speed and stored in the memory 106.

The process then moves to block B510, where characteristics of a line segment to be drawn are determined based on the values of several variables. Again, the line segment characteristics such as color, opacity and/or thickness are determined according to the speed of the on-screen pointer during the set interval, where for faster speeds the color and opacity are lighter, and the thickness is less, and for slower speeds the color and opacity are darker, and the thickness is greater. In this embodiment, the line segment to be drawn does not extend between a previous position of the pointer and a current position of the pointer, as in the previous embodiments. Rather, the line segment to be drawn extends from the endpoint of the last previously drawn line segment and a point on a line between that endpoint and the current position of the pointer, but short of the current position of the pointer. Thus, at block B510 the process takes as inputs the values of the variables $Line_{OldX,Y}$ (the x,y coordinates of the endpoint of the last previously drawn line segment), $Pointer_{CurrentX,Y}$ (the x,y coordinates of the current position of the pointer), $Speed_{Current}$ (the speed of the pointer during the set interval), and a plurality of configuration variables 208 (FIG. 2). Values of these configuration variables 208 are set according to the type of input device being used, as discussed in detail below. The process produces as outputs the values of the variables $Line_{Width}$ (the width of the line segment to be drawn), $Line_{Opacity}$ (the opacity of the line segment to be drawn), $Line_{Color}$ (the color of the line segment to be drawn), and $Line_{NewX,Y}$ (the endpoint of the line segment to be drawn, where the starting point is the endpoint of the last previously drawn line segment, $Line_{OldX,Y}$).

Once the characteristics of the line segment to be drawn are determined, the process moves to block B512, where a line segment having the determined characteristics is drawn between $Line_{OldX,Y}$ and $Line_{NewX,Y}$. The process then moves to block B514, where $Pointer_{PreviousX,Y}$ is set equal to $Pointer_{CurrentX,Y}$, $Line_{OldX,Y}$ is set equal to $Line_{NewX,Y}$, and $Speed_{Previous}$ is set equal to $Speed_{Current}$. The process then moves to block B516, where it is determined whether a user input of an end signal has been detected. An end signal may comprise the user releasing a mouse button, lifting his or her finger off a touchpad, etc. If the user input of the end signal has been detected, the process ends at block B518. However, if the user input of the end signal has not been detected, then the process loops back to block B504 and blocks B504-B516 are repeated.

The process of FIG. 5 advantageously produces a smoother looking signature than the processes of FIGS. 3 and 4. In the processes of FIGS. 3 and 4, the line segments are drawn between a previous position of the pointer and a current position of the pointer. This aspect produces longer line segments than in the process of FIG. 5, which draws line segments between a previous line segment endpoint and a point somewhere short of where the pointer is currently. The process of FIG. 5 thus produces the signature using more line segments, and shorter line segments, resulting in smoother looking curves when viewed with the naked eye.

Figure 6:
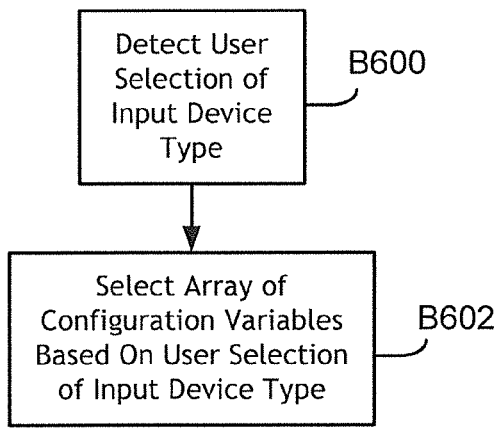
FIG. 6 is a flowchart illustrating one method of selecting configuration variables for use in creating an electronic signature, according to the present embodiments.

FIG. 6 is a flowchart illustrating one method of selecting values for the configuration variables 208 used in creating an electronic signature, according to the present embodiments. The configuration variables 208 are used to determine characteristics of line segments to be drawn to create the electronic signature, as discussed above and as described in further detail below. The values of these variables depend upon the type of input device being used. For example, the user's speed of motion tends to be higher when using a touchpad as opposed to when using a mouse. The configuration variables 208 take this variance in speed into account in order to produce signatures that have a consistent appearance regardless of the type of input device being used. For example, when the input device is a touchpad the sampling rate, i.e. the frequency with which the system receives an input of the location of the on-screen pointer, may increase, and when the input device is a mouse the sampling rate may decrease. The various configuration variables 208 and sample values therefor are discussed further below.

A plurality of sets of the configuration variables 208 are stored in the memory 106, with each set corresponding to a given type of input device. For example, one set for a mouse, one set for a touchpad, etc. In order to determine which set to use for a given signature session, the type of input device being used is first identified. In one method of identifying the type of input device, the user is presented with one or more selectable choices, such as a dropdown menu that lists a variety of input device types. The user selects one of the choices and this selection is detected at block B600 of FIG. 6. The process then moves to block B602, where a preset array (set) of configuration variables 208 stored in the memory 106 are selected for use in the present signature session, where the array selected corresponds to the detected user selection at block B600.

In another method of identifying the type of input device being used, the system detects characteristics of the motion of the input device and then deduces the type of input device based on the detected characteristics. For example, one of the detected characteristics may be the speed of motion. As stated above, the user's speed of motion tends to be higher when using a touchpad as opposed to when using a mouse. Thus, if the system detects that the input device is moving at a fast speed, it may deduce that the user is using a touchpad. Alternatively, if the system detects that the input device is moving at a slow speed, it may deduce that the user is using a mouse.

Figure 7:
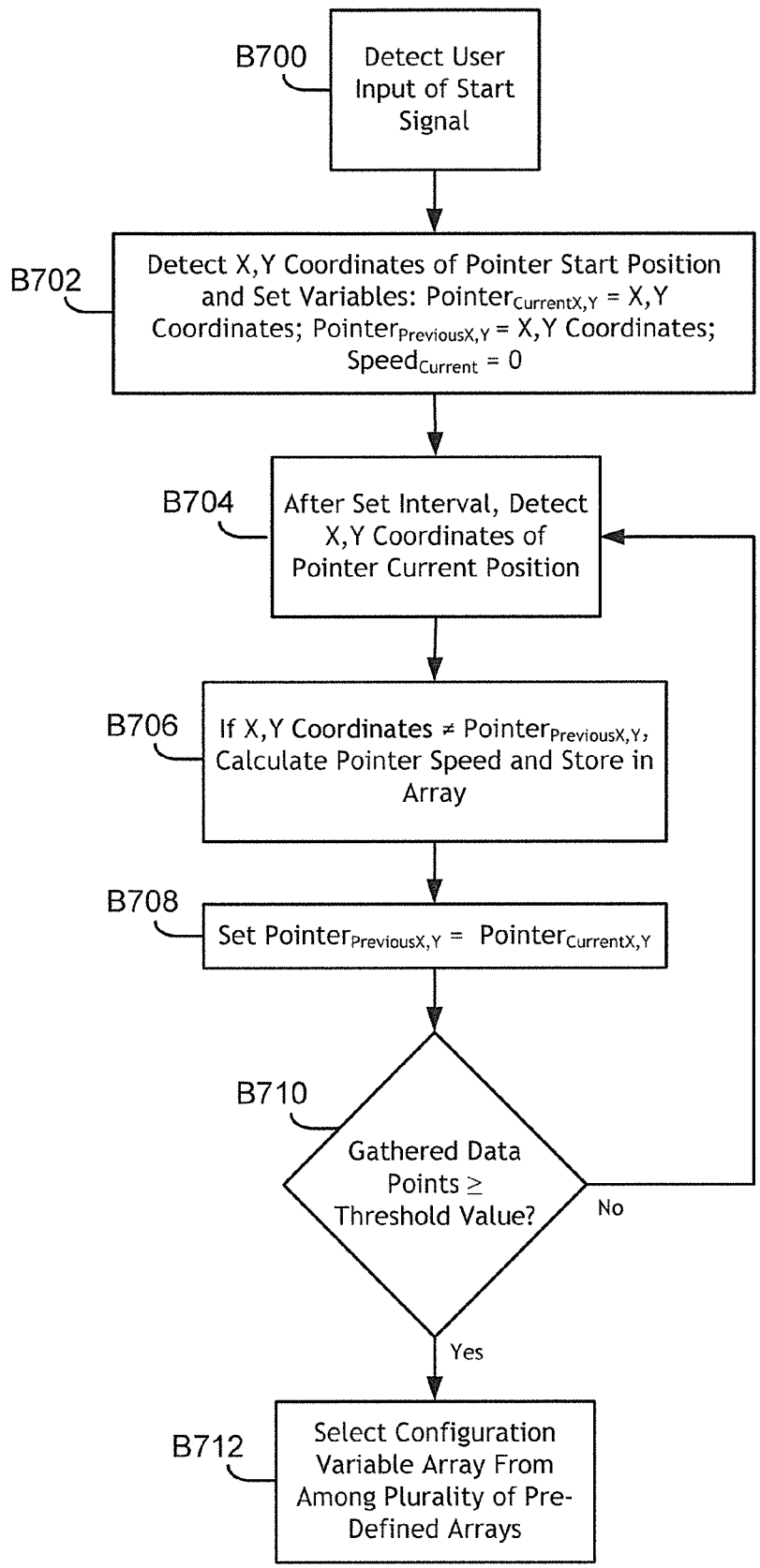
FIG. 7 is a flowchart illustrating another method of selecting configuration variables for use in creating an electronic signature, according to the present embodiments.

FIG. 7 is a flowchart illustrating one embodiment of a method for selecting configuration variables 208 based on detected characteristics of the motion of the input device. Broadly, this embodiment captures data points that represent characteristics of the motion of the on-screen pointer, such as its speed, during an initial period after a detection of a user input of a start signal. The system then uses the gathered data points to make a determination of what type of input device is being used. The system then selects a predefined array of configuration variables 208 from among a plurality of predefined arrays of configuration variables 208 stored in the memory 106. The selection is based upon the gathered data points.

The process begins at block B700, where the system detects a user input of a start signal. The process then moves to block B702, where the system detects the x,y coordinates of the start position of the on-screen pointer, and stores this location in the memory 106 as the variable $Pointer_{CurrentX,Y}$. The process also sets the value of the variable $Pointer_{PreviousX,Y}$ equal to the detected x,y coordinates and stores this value in the memory 106. The process further sets the value of the variable $Speed_{Current}$ equal to zero and stores this value in the memory 106.

The process then moves to block B704, where, after a set interval, the system detects the x,y coordinates of the current position of the on-screen pointer. The process then moves to block B706, where, if the detected x,y coordinates are not equal to $Pointer_{PreviousX,Y}$ the system calculates the pointer's speed and stores it in an array as a data point. The data point represents the pointer's speed during the sampled interval. The process then moves to block B708, where $Pointer_{PreviousX,Y}$ is set equal to $Pointer_{CurrentX,Y}$.

The process then moves to block B710, where the system determines whether the data points gathered so far are greater than or equal to a threshold value. The threshold value represents the number of data points that will be gathered before a determination will be made as to what type of input device is being used. The threshold value can be set to any value, such as ten, twenty, one-hundred, or any other number. If it is determined at block B710 that the gathered data points are not greater than or equal to the threshold value, the process loops back to block B704 and blocks B704-B710 are repeated as more data points are gathered.

However, if it is determined at block B710 that the gathered data points are greater than or equal to the threshold value, then the process moves to block B712, where an array of configuration variables 208 is selected from among a plurality of pre-defined arrays of configuration variables 208 stored in the memory 106. The selection is based upon the data points gathered and stored in blocks B704-B710. Again, each of the data points represents a speed of the pointer during the sampled interval. If the data points indicate that the pointer was moving quickly during the period in which the data points were being gathered, then it may be determined that the user is using a touchpad, for example. The system would thus select the array of configuration variables 208 corresponding to a touchpad.

The data points can be used in a variety of different ways for determining what input device is being used. For example, a speed of the input device may be determined according to a maximum speed achieved during the period when the data points are gathered. In other words, the data point having the greatest magnitude determines the speed of the input device and is used to select the corresponding array of configuration variables 208. Alternatively, a speed of the input device may be determined according to an average speed of the input device during the period when the data points are gathered, or according to a frequency of accelerations and decelerations during this period, as deduced from a pattern of the data point values. Other ways for determining what input device is being used based on the gathered data points may be contemplated, and the foregoing examples should not be interpreted as limiting.

FIG. 8 is example code for setting values of the configuration variables 208, which configuration variables 208 influence line characteristics in creating an electronic signature, according to the present embodiments. The code includes a first segment 800 that sets values for an array of configuration variables 208 corresponding to a mouse (Config_Array ['Mouse']). The code further includes a second segment 802 that sets values for an array of configuration variables 208 corresponding to a touchpad (Config_Array['Touchpad']). Any number of arrays may be provided corresponding to any number of input devices. The illustrated examples should not be interpreted as limiting.

The illustrated configuration variables 208 include A_Adjust, B_Adjust, Draw_Interval, and Array_Speed. A_Adjust and B_Adjust represent adjustments to the length of the line segment to be drawn in a given interval, as further detailed below. The configuration variable Draw_Interval represents the sampling interval, or the amount of time between each instance of detecting the location of the pointer. In the illustrated embodiment, Draw_Interval is represented in milliseconds, but could be measured using any unit of time. Thus, for a mouse the Draw_Interval is 50 ms, while for a touchpad the Draw_Interval is 20 ms. These values are examples only, and should not be interpreted as limiting.

The configuration variable Array_Speed represents an array of values for the characteristics of a line segment to be drawn for a given interval, which characteristics are determined according to the speed of the pointer during the given interval. For example, in FIG. 5, block B510, $Line_{Width}$, $Line_{Opacity}$, and $Line_{Color}$ are set based in part on $Speed_{Current}$. One possible way to determine these values is with a preset array, such as Array_Speed in FIG. 7. In this implementation, for a given speed value, $Line_{Width}$, $Line_{Opacity}$, and $Line_{Color}$ are explicitly defined. Then this array is used as part of the FIG. 5, block B510 process to set $Line_{Width}$, $Line_{Opacity}$, and $Line_{Color}$ based on $Speed_{Current}$. For example, Array_Speed={
1=[0.5, 2, 20], //set as [$Line_{Width}$, $Line_{Opacity}$, and $Line_{Color}$]
2=[0.55, 4, 25]
....
]

If $Speed_{Current}=2$, then $Line_{Width}$ is set to 0.55, $Line_{Opacity}$ is set to 4, and $Line_{Color}$ is set to 25 (in this example representing a greyscale value between 1 and 100).

FIG. 9 illustrates a process for creating an electronic signature using the configuration variables 208 described above, according to the present embodiments. The process of FIG. 9 tracks the process of FIG. 5, but provides further details as to how the configuration variables 208 are used in blocks B510-B514. The process includes the following variables:

$Line_{OldX,Y}$—The x,y coordinates of the endpoint of the last drawn line segment, or the start position of the signature session if no line segment has been drawn yet $Pointer_{CurrentX,Y}$—The x,y coordinates of the current position of the on-screen pointer $Adjust_{OldX}$—An adjustment made to the x coordinate of the endpoint of the last line segment drawn $Adjust_{OldY}$—An adjustment made to the y coordinate of the endpoint of the last line segment drawn $Adjust_{NewX}$—An adjustment to be made to the x coordinate of the endpoint of the next line segment to be drawn $Adjust_{NewY}$—An adjustment to be made to the y coordinate of the endpoint of the next line segment to be drawn $Line_{NewX}$—The x coordinate of the endpoint of the line segment to be drawn $Line_{NewY}$—The y coordinate of the endpoint of the line segment to be drawn In Step 1, the foregoing variables are set as follows:
$Line_{OldX,Y}=Pointer_{CurrentX,Y}$
$Pointer_{CurrentX,Y}=(X_P, Y_P)$, i.e. the x,y coordinates of the start position of the on-screen pointer
$Adjust_{OldX}$=Undefined
$Adjust_{OldY}$=Undefined
$Adjust_{NewX}=((Pointer_{CurrentX}-Line_{OldX})*A\_Adjust)*B\_Adjust$
$Adjust_{NewY}=((Pointer_{CurrentY}-Line_{OldY})*A\_Adjust)*B\_Adjust$
$Line_{NewX}=Line_{OldX}+Adjust_{NewX}$
$Line_{NewY}=Line_{OldY}+Adjust_{NewY}$ In Step 2, the foregoing variables are reset as follows:
$Adjust_{NewX}=(Adjust_{OldX}+(Pointer_{CurrentX}-Line_{OldX})*A\_Adjust)*B\_Adjust$
$Adjust_{NewY}=(Adjust_{OldY}+(Pointer_{CurrentY}-Line_{OldY})*A\_Adjust)*B\_Adjust$
$Line_{NewX}=Line_{OldX}+Adjust_{NewX}$
$Line_{NewY}=Line_{OldY}+Adjust_{NewY}$
$Adjust_{OldX}=Adjust_{NewX}$
$Adjust_{OldY}=Adjust_{NewY}$ The system then draws a line segment from $Line_{OldX,Y}$ to $Line_{NewX,Y}$, and sets $Line_{OldX,Y}=Line_{NewX,Y}$. Step 2 is repeated for each instance of blocks B510-B514, i.e. each time the process loops back to B504 because a user input of an end signal is not detected at block B516, Step 2 will be repeated when blocks B510-B514 are executed.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine-implemented method for producing a signature on an electronic display of a computing device using an input device that controls a pointer on the display, the method comprising:
   (a) detecting a user input of a start signal;
   (b) detecting x, y coordinates of a start position of the pointer, and storing the start position in a memory associated with the computing device as a first variable;
   (c) waiting for a set interval;
   (d) after the set interval, detecting x, y coordinates of a current position of the pointer, and storing this location in the memory as a second variable;
   (e) determining whether the first variable is equal to the second variable;
   (f) if the first variable is not equal to the second variable; calculating a speed of the pointer during the set interval, setting a third variable equal to the calculated speed, and storing the third variable value in the memory;
   (g) setting a fourth variable equal to the first variable;
   (h) calculating an end point of the line segment to be drawn based on the first variable, second variable, third variable, and fourth variable, and setting a fifth variable equal to this calculated value;
   (i) determining color, opacity, and/or thickness of a line segment to be drawn based on the values of the first, second, and third variables; and
   (j) drawing the line segment on the display having the determined color, opacity, and/or thickness between the fourth variable and the fifth variable, wherein the fourth variable is a starting point of the line segment and the fifth variable is the end point of the line segment;
   (k) setting the value of the fourth variable equal to the value of the fifth variable;
   (l) setting the first variable equal to the second variable;
   (m) waiting for a set interval and repeating steps (d)-(l).

2. The method of claim 1, further comprising, if the first variable is equal to the second variable, returning to the step of waiting for a set interval, and repeating any subsequent steps.

3. The method of claim 1, further comprising setting the fifth variable equal to the second variable, wherein the second variable represents the current location of the pointer, and the fifth variable represents the end point of the line segment to be drawn.

4. The method of claim 1, further comprising detecting if an end signal has been input.

5. The method of claim 4, further comprising, if no end signal has been input, returning to the step of waiting for a set interval, and repeating all steps subsequent to and including the step of waiting for a set interval.

6. A system for producing an electronic signature, comprising:
- a signature generator module, the signature generator module including an input module, a processing module, and an output module;
- a plurality of position variables;
- a plurality of configuration variables; and
- a display;
- wherein the signature generator module is configured to
    - (a) detect a user input of a start signal;
    - (b) detect x,y coordinates of a start position of the pointer, and store the start position in a memory associated with a computing device as a first variable;
    - (c) wait for a set interval;
    - (d) after the set interval, detect x,y coordinates of a current position of the pointer, and store this location in the memory as a second variable;
    - (e) determine whether the first variable is equal to the second variable;
    - (f) if the first variable is not equal to the second variable, calculate a speed of the pointer during the set interval, set a third variable equal to the calculated speed, and store the third variable value in the memory;
    - (g) set a fourth variable equal to the first variable;
    - (h) calculate an end point of the line segment to be drawn, based on the first variable, second variable, third variable, and fourth variable and set a fifth variable equal to this calculated value;
    - (i) determine color, opacity, and/or thickness of a line segment to be drawn based on the values of the first, second, and third variables; and
    - (j) draw the line segment on the display having the determined color, opacity, and/or thickness between the fourth variable and the fifth variable, wherein the fourth variable is a starting point of the line segment and the fifth variable is an end point of the line segment;
    - (k) set the value of the fourth variable equal to the value of the fifth variable;
    - (l) set the first variable equal to the second variable;
    - (m) wait for a set interval and repeat steps (d)-(l).

7. The system of claim 6, wherein the signature generator module is configured to, if the first variable is equal to the second variable, return to the step of waiting for a set interval, and repeat any subsequent steps.

8. The system of claim 6, wherein the signature generator module is further configured to set the fifth variable equal to the second variable, wherein the second variable represents the current location of the pointer, and the fifth variable represents the end point of the line segment to be drawn.

9. The system of claim 6, wherein the signature generator module is further configured to detect if an end signal has been input.

10. The system of claim 9, wherein the signature generator module is further configured to return to the step of waiting for a set interval, and repeat all steps subsequent to and including the step of waiting for a set interval, if no end signal has been input.

11. A machine-implemented method for producing a signature on an electronic display of a computing device using an input device that controls a pointer on the display, the method comprising:
- detecting a user input of a start signal;
- detecting x,y coordinates of a start position of the pointer, and storing the start position in a memory associated with the computing device as a first variable;
- waiting for a set interval;
- after the set interval, detecting x,y coordinates of a current position of the pointer, and storing this location in the memory as a second variable;
- calculating a distance between the values of the first and second variables;
- determining color, opacity, and/or thickness of a line segment to be drawn based on the values of the first and second variables; and
- drawing the line segment on the display having the determined color, opacity, and/or thickness between the first and second variables.

12. The method of claim 11, further comprising setting the first variable equal to the second variable, wherein the first variable represents the start point of the currently drawn line segment.

13. The method of claim 12, further comprising detecting if an end signal has been input.

14. The method of claim 13, further comprising, if no end signal has been input, returning to the step of waiting for a set interval and repeating all steps subsequent to and including the step of waiting for a set interval.

15. The method of claim 11, wherein the steps of detecting x,y coordinates of a start position of the pointer, and storing the start position in a memory associated with the computing device as the first variable are performed asynchronously.

16. The method of claim 11, wherein the set interval is 100 ms.

* * * * *

UNITED STATES PATENT AND TRADEMARK OFFICE
CERTIFICATE OF CORRECTION

| | | |
|---|---|---|
| PATENT NO. | : 9,311,725 B2 | Page 1 of 1 |
| APPLICATION NO. | : 13/910991 | |
| DATED | : April 12, 2016 | |
| INVENTOR(S) | : Clark | |

It is certified that error appears in the above-identified patent and that said Letters Patent is hereby corrected as shown below:

In the claims

Column 12, line 50, claim 1, delete "filth" and insert --fifth--, therefore.

Signed and Sealed this
Fifth Day of July, 2016

Michelle K. Lee
*Director of the United States Patent and Trademark Office*